United States Patent
Amend

(10) Patent No.: US 12,439,936 B2
(45) Date of Patent: Oct. 14, 2025

(54) PROCESS AND DEVICE FOR APPLICATION OF PARTICLES ONTO FROZEN CONFECTIONERY

(71) Applicant: SOCIETE DES PRODUITS NESTLE S.A., Vevey (CH)

(72) Inventor: Thomas Aloisius Valentinus Amend, Singapore (SG)

(73) Assignee: Societe des Produits Nestle S.A., Vevey (CH)

( * ) Notice: Subject to any disclaimer, the term of this patent is extended or adjusted under 35 U.S.C. 154(b) by 304 days.

(21) Appl. No.: 18/257,000

(22) PCT Filed: Dec. 10, 2021

(86) PCT No.: PCT/EP2021/085279
§ 371 (c)(1),
(2) Date: Jun. 12, 2023

(87) PCT Pub. No.: WO2022/128813
PCT Pub. Date: Jun. 23, 2022

(65) Prior Publication Data
US 2024/0049743 A1    Feb. 15, 2024

(30) Foreign Application Priority Data
Dec. 15, 2020  (EP) .................................... 20214326

(51) Int. Cl.
| | | |
|---|---|---|
| *A23G 9/24* | (2006.01) | |
| *A23G 9/26* | (2006.01) | |
| *A23G 9/48* | (2006.01) | |
| *A23G 9/50* | (2006.01) | |
| *B65G 47/90* | (2006.01) | |

(52) U.S. Cl.
CPC ............... *A23G 9/245* (2013.01); *A23G 9/26* (2013.01); *A23G 9/48* (2013.01); *A23G 9/503* (2013.01); *B65G 47/90* (2013.01); *B65G 2201/0202* (2013.01)

(58) Field of Classification Search
None
See application file for complete search history.

(56) References Cited

U.S. PATENT DOCUMENTS

| | | | |
|---|---|---|---|
| 4,189,289 A | 2/1980 | Getman | |
| 4,353,927 A | 10/1982 | Lovercheck | |
| 6,251,456 B1 | 6/2001 | Maul et al. | |
| 2017/0311622 A1 | 11/2017 | Brawn et al. | |

FOREIGN PATENT DOCUMENTS

| | | |
|---|---|---|
| CN | 204377815 U | 6/2015 |
| EP | 0628254 | 12/1994 |
| EP | 2308319 A1 | 4/2011 |
| GB | 301911 | 8/1929 |
| GB | 1308713 | 3/1973 |
| GB | 2015862 | 9/1979 |
| GB | 2527076 | 12/2015 |

OTHER PUBLICATIONS

Chinese Office Action for Appl No. 202180078755.1 dated Jun. 16, 2025, 6 pages.

*Primary Examiner* — Jyoti Chawla
(74) *Attorney, Agent, or Firm* — K&L Gates LLP

(57) ABSTRACT

The invention relates to an apparatus for decorating frozen confectionery (1) on sticks, the apparatus comprising: a coating station (4) for applying coating material onto the frozen confectionery (1), a particle dispensing station (7) for applying particles onto the coated frozen confectionery, a conveyor (3) for moving the frozen confectionery past the coating station and the particle dispensing station, the conveyor (3) comprising gripping means (2) arranged on the conveyor (3) and having a product attached position and an opened position for gripping and releasing the stick of the frozen confectionery (1), and the conveyor (3) comprising guides for moving the gripping means with the frozen confectionery between a vertical position and a horizontal position, and wherein the apparatus further comprises a heating station (11) installed at a position between the coating station (4) and the particle dispensing station (7), and wherein the gripping means (2) are arranged to hold the frozen confectionery in the horizontal position when passing the heating station (11) and the particle dispensing station (7), and optionally coating removal means (6) for removing coating material on one side of the frozen confectionery, which coating removal means (6) are at a position after the coating station (4) in the direction of the movement of the conveyor (3) and before the particle dispensing station. The invention also relates to a method for manufacturing decorated frozen confectionery on sticks making use of the apparatus.

12 Claims, 2 Drawing Sheets

PROCESS AND DEVICE FOR APPLICATION OF PARTICLES ONTO FROZEN CONFECTIONERY

CROSS REFERENCE TO RELATED APPLICATIONS

The present application is a National Stage of International Application No. PCT/EP2021/085279, filed on Dec. 10, 2021, which claims priority to European Patent Application No. 20214326.9, filed on Dec. 15, 2020, the entire contents of which are being incorporated herein by reference.

FIELD OF THE INVENTION

The present invention relates to an apparatus for decorating frozen confectionery on sticks and a method for manufacturing the frozen confectionery. In particular, the invention relates to an industrial method for decorating frozen confectionery on a stick with a reduced amount of waste.

BACKGROUND

Frozen confectionery bars with a coating and decorative particles sprinkled onto the coating are well known and appreciated by the consumer. Manually decorated products, i.e. products with particles applied onto ice cream bars, to create artisanal, individualized products are particular popular with consumers. Such products are typically hand-made in ice cream shops by dipping an ice cream bar into a coating and then sprinkling particles onto the product surface before the coating solidifies. This allows the particles to well adhere to the coating. Both one or both sides can be coated this way. In a typically application, the ice cream bar is dipped into a coating material, then transferred onto a paper tray, where the particles are sprinkled to one or both sides of the bar. Any coating drip and particles which do not adhere onto the bar, or fall down on the side of the product, remain on the tray. The tray with the product, any loose particles and coating drip, is then offered to the consumer.

Such products may be prepared by a process where either the consumer or an employee of an ice cream store customises the ice creams with a choice of toppings and dips. In this process, uncoated ice cream bars are dipped into liquid coating material. Immediately after coating, particles are sprinkled onto the coating, while the coating is still liquid. After a few seconds, the coating solidifies, and the embedded particles become fixed in place. This ensures that the particles do not fall off when the product is consumed. The type of particles may be nuts, cookie pieces, rice crispies, fruits, flower petals, chocolate bits or any other edible particulates. The weight, size and shape of the particles may vary. Furthermore, frequently, a small amount of liquid chocolate is drizzled in the form of lines over the product after adding the particles.

For this manual process, both frozen confectionery bars from an extrusion process and bars from a molding process, can be used. However, bars manufactured in an extrusion process are more frequently used due to their generally better textural quality. Ice cream parlors selling such freshly coated products exist.

Unfortunately, there is no equivalent process available in industrial ice cream manufacturing that would replicate that manual procedure.

An alternative way to make frozen confectionery bars that exhibit some of the characteristics of the above mentioned manually decorated products is used by Seika Foods (Japan). It involves filling liquid or partially frozen confectionery mix into a plastic tray with the shape of the finished product. On top of this layer, particles are added, possibly complemented by sauces, fruit pieces, and decorations. After final freezing, the product, including the tray, is wrapped in a plastic pouch for distribution and sale. While this process allows to add a variety of particles onto one side of the product, like the above mentioned manually decorated bars, these products have no enrobing on the ice cream part, hence they do not fully replicate the appearance of the manually decorated bars.

The challenge of replicating manually decorated bars is explained in the following description of existing procedures of applying a liquid coating material and particles onto ice cream bars: In industrial ice cream manufacturing, bars of frozen dessert, which are coated and which include particles on their surface, are well known for a long time. Two types of processes are typically used in the manufacturing of such products. In a first process, the frozen dessert bar is dipped into a liquid coating wherein the particles are suspended (C. Clark, The Science of ice Cream, RSC Paperbacks, 2005, page 94 f). Various particles may be used, such as nuts. The particles need to be kept suspended and evenly distributed in the coating during the process. During dipping, the coating and the particles adhere to the surface of the frozen dessert bar and are fixed as the coating solidifies. It is important that the particles do not fall off but remain adhered to the product surface until the coating is solidified. The choice of particles is therefore limited to those which are not too heavy. Another characteristic of this method is that the particles are covered with coating so that details of their shape and color are at least partially masked.

In a second process of applying particles, called dry coating, particles are attached to the surface of the coating material right after dipping and before the coating solidifies. During this process, the frozen dessert bars are first dipped into a coating material, immediately followed by projecting the particles against the surface. In a typical dry coating process, the dipped bars are lowered into an equipment called dry coater. In that machine, rotating paddles throw the dry particles against the still sticky product surface (C. Clark, The Science of ice Cream, RSC Paperbacks, 2005, page 98). The particles suitable for dry coating must be carefully selected, since particles too heavy will fall off from the vertical surface. Hence, there is a limitation regarding the particles that can be attached.

Both existing processes of adding particles onto the bars thus have limitations regarding the choice and visibility of particles, which clearly distinguish them from the above-mentioned manually coated bars.

There is therefore a need to for an industrial method for manufacturing frozen confection, which provides the visual appearance of manually decorated products, and without the limitations inherent to the industrially used coating procedures discussed above.

Object of the Invention

It is the object of present invention to provide an apparatus and method for coating of frozen confectionery for an artisanal appearance. Furthermore, it is an objective to minimize waste of particles and coating material in the method.

SUMMARY OF THE INVENTION

In a first aspect, the invention relates to an apparatus decorating frozen confectionery (1) on sticks, the apparatus comprising:

a coating station (4) for applying coating material onto the frozen confectionery (1), a particle dispensing station (7) for applying particles onto the coated frozen confectionery, a conveyor (3) for moving the frozen confectionery past the coating station and the particle dispensing station, the conveyor (3) comprising gripping means (2) arranged on the conveyor (3) and having a product attached position and an opened position for gripping and releasing the stick of the frozen confectionery (1), and the conveyor (3) comprising guides for moving the gripping means with the frozen confectionery between a vertical position and a horizontal position, and wherein the apparatus further comprises a heating station (11) installed at a position between the coating station (4) and the particle dispensing station (7), and wherein the gripping means (2) are arranged to hold the frozen confectionery in the horizontal position when passing the heating station (11) and the particle dispensing station (7), and optionally coating removal means (6) for removing coating material on one side of the frozen confectionery, which coating removal means (6) are at a position after the coating station (4) in the direction of the movement of the conveyor (3) and before the particle dispensing station.

In a second aspect, the invention relates to a method for manufacturing decorated frozen confectionery (1) on sticks, the method comprising:

providing an apparatus according to claims 1 to 12,
attaching the frozen confectionery (1) by the stick with the gripping means (2) on the conveyor (3),
moving the frozen confectionery past the coating station while applying a coating,
bringing the frozen confectionery to a horizontal position,
optionally removing liquid coating with the coating removal means (6) from one side of the frozen confectionery,
heating the upper surface of the frozen confection prior to
moving the frozen confectionery past the particle dispensing station (7) while adding particles to the upper surface of the frozen confectionery,
optionally cooling and
releasing gripping means (2) and the decorated frozen confectionery (1).

The present invention overcomes the limitations of existing procedures of applying coating and particles by providing a heating step and optionally a coating removal step, avoiding the coating material agglomerating the particles while allowing the particles to be well embedded into and/or attached to the coating.

The apparatus and the method according to the invention allows the creation of frozen confectionery products, comparable to a manually decorated frozen dessert bar, on an industrial production line. In particular, the process of the invention can be made on a standard ice cream extrusion line, widely used in industry, to create extruded bars with a coating, as e.g. described in "H. D. Goff and R. W. Hartel—Ice Cream, Seventh Edition, Springer, 2013, page 277 ff.

DETAILED DESCRIPTION OF THE INVENTION

Figure 1:
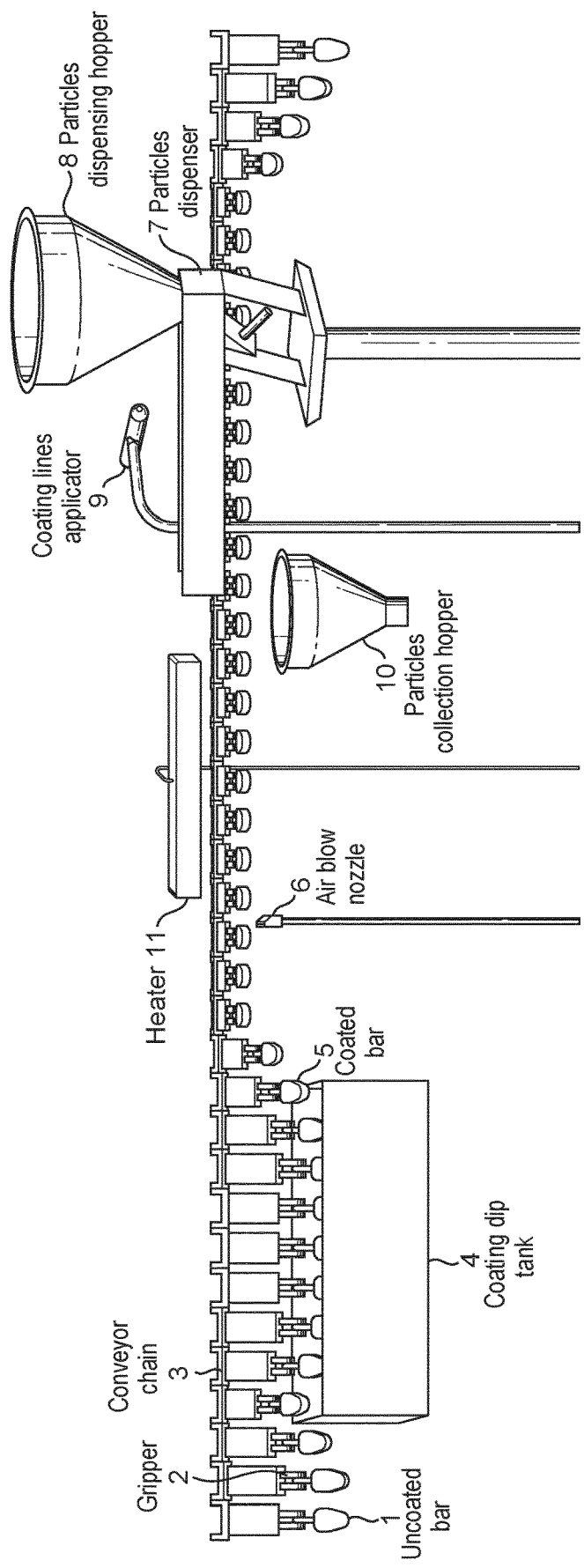
FIG. 1 illustrates a layout of an embodiment of the apparatus of the present invention and the method of applying particles onto one side of a frozen dessert bar.

According to the invention it has surprisingly been found that an apparatus for decorating frozen confectionery on sticks can produce products which resemble handmade products, in a industrial manufacturing setting.

It has also been found that, according to the invention, various features of the process that contribute to material losses can be drastically reduced.

The invention relates to an apparatus for decorating frozen confectionery on stick. The apparatus comprising: a coating station for applying coating material onto the frozen confectionery, a particle dispensing station for applying particles onto the coated frozen confectionery, and a conveyor for moving the frozen confectionery past the coating station and the particle dispensing station. The conveyor comprising gripping means arranged on the conveyor and having a product attached position and an opened position for gripping and releasing the stick of the frozen confectionery. The gripping means are preferably arranged perpendicular to the direction of the movement of the conveyor. The conveyor comprises guides for moving the gripping means with the frozen confectionery between a vertical position and a horizontal position. This allows the frozen confectionery to be moved in and out of the stations. For example, the frozen confectionery can be held vertically and moved into and out of a coating bath. The apparatus further comprises a heating station installed at a position between the coating station and the particle dispensing station. The gripping means are arranged to hold the frozen confectionery in the horizontal position when passing the heating station and the particle dispensing station. The apparatus according to the invention has optional coating removal means for removing coating material from the underside of the frozen confectionery, which coating removal means are at a position after the coating station in the direction of the movement of the conveyor and before the heating station.

The position of the coating removal means is preferably beneath the conveyor in the direction of the movement of the conveyor.

The coating station may be adapted to apply the coating by dipping, spraying or showering. In a preferred embodiment, the coating station is a dipping station.

The apparatus according to the invention has a heating station mounted above the path of the coated bars preferably after the coating removing means, preferably an air knife, and before the particle dispensing station. The heating station preferably comprises a radiation heater or a hot air blowing heater or other means to warm the surface. In a preferred embodiment of the invention the heating station comprises a radiation heater. The heater provides an extended time for the setting of the coating and helps reduce losses of particulates.

The apparatus further has a particle dispensing station, which is positioned above the conveyor and after the coating removal means. The gripping means are arranged to hold the frozen confectionery in the horizontal position when passing the particle dispensing station. Guides are used to move the grippers with the products between a vertical and a horizontal position. The effect of this is that pieces can be applied to the frozen confectionery's coated upper side (with the dispenser above, only the upper side is sprinkled with particles), while the coating is still sufficiently soft so that the particles will adhere to the coating. It is preferred that the gripping means hold the frozen confectionery in a horizontal position when the conveyor passes the heating station and the particle dispensing station for the particles to land on the upper horizontal side of the frozen confection.

In the present context, particles may be any kind of food particles or pieces thereof e.g. nuts, cookie pieces, rice crispies, fruits, flower petals, chocolate bits or any other edible particulate material. The weight, size and shape of the particles may vary. The invention is particular useful for dosing bigger particles such as whole nuts or berries. The size of the particles is preferably in the range of 2-20 mm, more preferably in the range of 5-15 mm, the size being the longest dimension of the particle. However, bigger particles may also be applied.

In a preferred embodiment of the invention the process apply particles to a freshly coated frozen confectionery bar, while the bars are being conveyed along a production line. It comprises dipping the bar into a coating at the coating station, then bringing the bar into an horizontal position by means of the guides lifting the gripping means.

After applying the coating, the product preferably continues being conveyed in a horizontal position towards the heater station. The heater station is mounted above the path of the coated bars before the particle dispensing station. During the time of travel, the coating drip eases and finally stops, while the coating starts solidifying.

Further solidification of the coating on the upper side of the product, however, is interrupted when the product enters the heating station. However. despite the heating of the upper side, it has been found that the solidification of the coating on the underside and at the vertical sides of the bar continues, while the coating at the upper side remains sufficiently liquid to provide good fixation of the sprinkled particles.

It has been found that the use of a heating station thus allows application of particles at a later time. In particular, it allows to apply the particulates at a stage when dripping has largely stopped and when the coating on the vertical sides and on the underside is no longer sticky. Particles touching the vertical sides at this stage would bounce off and fall down immediately, rather than getting stuck on the sides, slowly sliding down and finally falling off the bar while being contaminated with coating. Those particles contribute to losses for two reasons: Firstly, they fall off the bar with delay since they get initially stuck to the coating, requiring collection and recycling equipment along a larger part of the product conveyor. Secondly, those particles, after having touched the coating on the vertical sides, are contaminated with coating, which makes them prone to agglomeration and unsuitable for re-use. Hence, those particles, falling off with a delay or from the sides and being contaminated with coating, are a source of losses that can be effectively remedied by using the apparatus and process according to the invention comprising a heater station.

While the apparatus and the process according to the invention allows manufacturing of an artisanal looking product, the solidification of the coating at the underside while the bar is in a horizontal position has consequences. For one, multiple, elongated drops may be formed on that side. Those drops represent an undesirable visual feature. Furthermore, the horizontal position of the bar results in a larger amount of coating remaining on the bar compared to a conventional dipping process with the bar kept vertically.

An excessive amount of coating is not desirable due to cost and increase in caloric value of the product.

Further, large drops of coating on the underside take more time to solidify and increase the time span before dripping stops and particles can be applied. It further causes sticking of the bar onto the wrapper material.

Therefore, according to the present invention in a preferred embodiment the excess coating on the underside may be removed prior to solidification to improve the visual appearance, reduce the caloric value and shorten the process.

It has been found that excess coating can be effectively removed with coating removal means.

In a preferred embodiment of the apparatus according to the invention, the coating removal means provide an airflow adapted to partially remove coating material, which may otherwise drip from the frozen confectionery. Only the outer layer of the coating which is not yet solidified is removed from the frozen confectionery, while a continuous coating coverage remains on the bar.

The coating removing means may consist of one or more air knifes or other nozzle arrangements which create an air curtain suitable to remove the liquid coating. Another coating removal means may be a mechanical scraper, arranged so that the frozen confectionery passes over that mechanical scraper in a way to remove liquid coating without damaging solidified parts of the coating and without damaging the frozen confectionery.

When an airflow is used for removing the excess coating material, splashing of coating material during blowing is preferably contained by a shield surrounding the air knife. It is furthermore preferred to warm the shield and the air blow nozzle to prevent coating from building up on it.

Preferably, and based upon a top down view onto the bar, the air knife, knives and/or air curtain created from a slit-nozzle or a row of nozzle holes are positioned perpendicular to the direction of the conveyor movement of the product or with an angle of up to 60 degrees to either side measured from the position perpendicular to the direction of the movement of the products.

The use of air blowing to partially remove coating from one side of the bar may leave a pattern, similar to a fine wavy structure imprinted on the coating. If a scraper blade is used to remove excess chocolate, scratch marks are visible on the coating, running perpendicular to the axis of the stick.

The airflow from the coating removal means may be heated by means of a heating device. The advantage of this heating is to prevent build-up of coating material on the air knife or air nozzle, since coating dripping on the air knife or air nozzle will remain liquid and drip off.

In one embodiment of the invention, the apparatus comprises coating removal means in the form of a mechanical scraper. The scraper removes partly coating from the underside and stops dripping at least temporarily. This is achieved by installing it beneath the ice cream bars in such a way that liquid coating is scraped off the bar when the bars pass by. Preferably the mechanical scraper is a static bar or blade.

The particle dispensing station comprises a particle dispensing device and a particle dispensing hopper, for dispensing particles onto the frozen confectionery. The dispensing device can be a vibrating doser or a screw feeder or bowl feeder or any other device that provides a constant stream of particles.

The apparatus may also further comprise a particle supply system for collecting particles not attached to the frozen confectionery coating and conveying means to return collected particles back to the dispensing station. According to the invention, the collected particles may be re-used in the manufacturing process. The particle supply system e.g. comprising a hopper, is installed beneath the outlet of the particles dispenser and beneath the product path.

The apparatus may also comprise means for collecting removed or dripped coating material. For example, a drip pan for collecting the removed or dripped coating material may be used.

Furthermore, the apparatus may comprise a coating line applicator, preferably positioned after the particle dispenser in the direction of the movement of the conveyor. The line applicator provides decorative lines to the upper side of the products, which in addition to the decoration effect may also help to fix particles.

In a preferred embodiment of the apparatus according to the invention, the apparatus further comprises a coating lines applicator to apply decorative coating lines, typical for handmade products subject of this invention, on top of the particles on the bar.

The coating lines applicator is preferably positioned after the particle dispenser in the direction of the movement of the conveyor. Application of these lines is done after particles were sprinkled and with the bars still in a horizontal position. The coating lines preferably have a diameter of 1-5 mm thickness. Applicators for coating lines onto products positioned horizontally are well known and the principle is described e.g. in U.S. Pat. No. 3,824,950.

The benefit of the coating lines is primarily their decorative element, but they also help to fix loose particles on the bar.

The invention is now further described with reference to the drawings by way of example only.

The method of creating the frozen confectionery starts by providing uncoated bars with a wooden stick inserted. Firstly, frozen confectionery from a freezer is extruded through a nozzle. During this step, sticks are inserted, then slabs of frozen confectionery are cut off using a wire. The frozen confectionery slabs fall onto a conveyor belt which travels through a hardening tunnel, to freeze the frozen confection. At the exit of the tunnel, the hard frozen products are picked up from the belt by grippers holding them by the sticks.

For the subsequent steps of the method of invention, preferably a single-lane extrusion line may be used. It is a line widely used in ice cream manufacturing.

FIG. 1 shows, in a principle drawing, the apparatus and method according to the invention from this point forward on a single lane extrusion line. At this line, the grippers (2) with the uncoated frozen confectionery bar (1) suspended therefrom are fixed along an endless conveyor chain (3) that continually conveys the products to subsequent process steps.

The frozen confectionery products which are vertically suspended from the grippers, are conveyed towards the coating dip tank (4). To enter the coating dip tank, guide bars installed below the grippers push the grippers (2) up towards a horizontal or near horizontal position. Once raised over the rim of the dip tank, the grippers are lowered to fully immerse the bars (1) into the coating. Then the grippers (2) are again pushed up vertically to exit the dip tank (4).

In a standard industrial process, the bars are then lowered back down to a vertical position and excess coating drips or runs off the coated bars. The dripping may continue for about 10 to 30 seconds until the coating solidifies. The time of dripping is known to depend on various factors, with the most important being the coating composition and temperature and the frozen confectionery temperature.

In the process according to the invention, the bar is kept in a horizontal position after dipping by means of support bars holding the grippers. In an optional process step, to eliminate excessive coating, air blow nozzle (6) placed beneath the products, removes the unsolidified portion of the coating from the underside. The bar continues travelling and coating starts to solidify until the heater station with a heater (11) at which point solidification is halted or reversed on the upper side of the product. Right after the heating station, the particles dispenser (7) sprinkles particles, supplied from the particles dispensing hopper (8) onto the bar. Particles not landing on the products are collected by the particles collection hopper (10) which is part of a particle supply system and returned into the particles dispensing hopper (8) by appropriate conveyor means known in industry.

In the next step, the products pass by under a coating lines applicator (9) which provides a series of about 3 to 20 lines of coating material onto the particulates layer. The product is then kept in a horizontal position for about 1 to 10 more seconds, then lowered to a vertical position and finally conveyed to the wrapping station.

EXAMPLES

Example 1—Dripping of Coating at Different Times after Dipping

Table 1, Column 1, demonstrates the progression of dripping of coating from a bar held in horizontal position after the coating step. An extruded ice cream bar with a weight of 56 g is coated in a chocolate coating. The coating has a 48 wt. % fat content and a fat composition of 50 wt. % cocoa butter and 50 wt. % coconut oil. The coating has a temperature of 41 degrees Celsius. The ice cream has a temperature of −25 degrees Celsius. The bar is dipped into the coating for 1 sec, then removed and brought to a horizontal position. The weight of the coating remaining on the bar at different times is recorded.

TABLE 1

| Time (sec) after removing bar from coating | Column 1 Weight of coating on the bar (g) - only dipping | Column 2 Weight of coating on the bar (g) - with air blow at 2.7 sec |
| --- | --- | --- |
| 0 | 31.0 | 31.0 |
| 1.9 | 24.2 | 24.2 |
| 2.7 | 22.4 | 18.3 |
| 3.7 | 21.7 | 18.3 |
| 4.1 | 21.6 | 18.3 |
| 7.8 | 21.2 | 18.1* |
| 9.2 | 21.0* | 18.1 |

*Last drop

Right after dipping, before significant dripping has occurred, the weight of the coating on the bar is 31 g. Over the following seconds, the weight of the coating decreases as part of it drips off. During the first 2-3 seconds, dripping is strongest, then eases. The last drop falls off after 9.2 sec.

In order to reduce the dripping of coating into the particles supply system, it is preferred to apply particles to the bar after dripping has ceased after 9.2 sec, however, before the coating on the upper side has solidified.

Therefore, the solidification, and in particular the adhesion properties of particles on the bar are of interest. Good adhesion is important to prevent particles coming off during the wrapping step and during product handling in the distribution chain.

Example 2—Adhesion Properties at Different Times

Table 2 describes the adhesion of particles applied on the upper side of the bar at different times. In particular, it describes the adhesion properties of spherical rice crispies covered with a fat-based coating and a diameter of 5 mm, sprinkled onto the horizontal bar by a vibratory dispenser from a height of 10 cm at different times after the bars are lifted out of the dip tank.

All the particles which were sprinkled 4 seconds after removal of the bar from the dip tank are partially immersed in the coating layer to an equal depth. They cannot be easily removed when rubbing over them by hand after a 5 min waiting time after application. When sprinkling particles 6 seconds after removing the bar from the dip tank, the particles still resist rubbing by hand. However, particles located on the bar close to the edge where the wooden stick is inserted, are visibly less deep immersed into the coating layer compared to particles in the middle of the bar and near the tip of the bar. The particles still do not come off when rubbing over the bar by hand.

Table 2 shows the two adhesion parameters at different times after the products were removed from the dip tank.

TABLE 2

| Time until particles application (sec) | Observed adhesion properties |
|---|---|
| 4 | All particles resist to rubbing. Immersion depth of particles is the same all over the surface of the bar. |
| 6 | All particles resist to rubbing, but immersion of particles less deep near the stick compared to near the tip. |
| 9 | 4-5 pieces of particles near the stick easily fall off during rubbing. Those particles have barely immersed into the coating compared to those near the tip. |
| 14 | 15-20 pieces of particles near the stick easily fall off during rubbing. Those particles have barely immersed into the coating compared to those near the tip. |
| 24 | No particles adhering near the stick, all other particles fall off easily during rubbing. Immersion depth of the adhering particles was visibly low. |

After 9 seconds after sprinkling, when rubbing over the product, some particles located in the area of the bar next to the wooden stick came off easily. They have been barely immersed into the coating.

After 14 seconds, more particles came off easily during rubbing. After 24 seconds, particles near the stick did not adhere to the coating at all, all other particles come off easily when rubbing.

As shown in Example 1 and 2, it was found that particles should be sprinkled preferably before 9 seconds after the product has been removed from the dip tank in order to have good adhesion to the bar.

However, as shown in table 1 column A, there is still dripping during that time, which causes agglomeration of recycled particles and hence, material losses.

According to the invention, the process provides improvement in two ways: Firstly, by reducing dripping or stopping dripping earlier. This in turn, allows to dose particles at an earlier stage, without causing agglomeration, while the coating is still liquid, and the particles get well embedded. This can be achieved by removing excess coating from the underside using an air knife or scraper.

Secondly, by allowing the dripping to subside before sprinkling the particles, without using an air knife, and by extending the time before the coating on the upper side solidifies. This is achieved by warming the upper surface of the coating and keeping it liquid for longer before applying the particles.

Furthermore, a combination of the 2 techniques can be used.

Example 3—Description of Product Manufacturing Trial—Air Knife Only

An extruded ice cream bar with a weight of 56 g and an overrun of 40 wt. % is produced on a single-lane extrusion line. The bar is moving along a conveyor chain at a speed of 240 mm per second and dipped into a coating of 48 wt. % fat content with 50 wt. % of the fat being cocoa butter and 50 wt. % being coconut oil. The coating temperature is 41 degrees Celsius and the dipping time is 1 second. 2.7 seconds after removing the bar from the dip tank, the bar passes over an air knife. The air knife is positioned beneath the product path, pointing upwards vertically, with an angle of 90 degrees versus the direction of product movement. One second after the product has passed the air knife, a layer of particles is sprinkled onto the bar from a height of 10 cm. The particles consist of spherical rice crisps with a fat-based coating.

Two seconds after applying the particles, the product passes under a coating line applicator which applies lines of a compound coating. The product is held in a horizontal position for another 7 seconds, then lowered to a vertical position. The product is then transferred towards the wrapping machine and wrapped.

The resulting product consists of the following elements and has the visual appearance of a product made manually.

The frozen confectionery product consists of:

| | |
|---|---|
| Ice cream bar | 56 g |
| Coating | 18 g |
| Particles | 8 g |
| Drizzle lines | 3 g |

Figure 2:
FIG. 2 is a picture of finished ice cream bars with a coating, application of particles on one side and drizzle of coating lines, obtained with the apparatus and method of the invention.

The upper side of finished product is shown in FIG. 2a.

As demonstrated in Table 1, column B, the use of an air knife has caused a stop of dripping at the when the particulates are applied. This procedure therefore allows industrial manufacturing the desired product.

Example 4: Product Manufacturing with Heater

The previous examples demonstrated manufacturing by using an air knife to eliminate excessive dripping of coating prior to sprinkling the particles. In this example, it is shown how to use a heating station with a heater to solve the dripping problem.

An ice cream bar as described in Example 3 is dipped in coating and immediately brought to a horizontal position. About 8 sec after the bar has been coated, it is subjected to a radiation heater, which is located 7 cm above the surface of the bar and radiates downward, for a period of 4 seconds.

Particles are then sprinkled onto the surface 13 sec after the dipping process. In a last step, coating lines are applied about 2 seconds after the particle application.

A shown in table 1, there is no more dripping at the time of sprinkling the particles, hence the contamination of the recycled particles is eliminated.

The frozen confectionery product consists of:

| | |
|---|---|
| Ice cream bar | 56 g |
| Coating | 21 g |
| Particles | 8 g |
| Drizzle lines | 3 g |

As demonstrated in Table 1, column A, the application of particles after the coating has stopped dripping, in combination with an air (radiation) heater to keep the coating on the upper product side liquid while sprinkling particles, allows industrial manufacturing the desired product as well, however with a higher coating weight.

Example 5: Product Manufacturing with Air Knife and Heater

The previous 2 examples demonstrated manufacturing by using an air knife and by applying a heating step. In this example, it is shown that both elements can be combined as well. This set-up is schematically shown in FIG. 1.

An ice cream bar as described in Example 3 is dipped in coating and immediately brought to a horizontal position. 2.7 seconds after removing the bar from the dip tank, the bar passes over an air knife, as described in Example 3. About 8 sec after the bar has been coated, it is subjected to a radiation heater, as described in example 4.

Particles are then sprinkled onto the surface 13 sec after the dipping process. In a last step, coating lines are applied about 2 seconds after the particle application.

As shown in the previous example, there is no more dripping at the time of sprinkling the particles, and the product exhibits a smooth surface on the underside, without exhibiting drops of coating. Furthermore, the weight of of the product is as low as demonstrated in example 3.

The frozen confectionery product consists of:

| | |
|---|---|
| Ice cream bar | 56 g |
| Coating | 18 g |
| Particles | 8 g |
| Drizzle lines | 3 g |

The use of both an air knife and a heating step was demonstrated as a successful production method. This method results in a lower coating weight compared to Example 4.

While the methods described in Examples 3, 4 and 5 can provide the desired product according to the invention, factors such as coating weight and space available on the line may favor one method over the other in certain cases.

The invention claimed is:

1. Apparatus for decorating frozen confectionery on sticks, the apparatus comprising:
   a coating station for applying coating material onto the frozen confectionery,
   a particle dispensing station for applying particles onto the coated frozen confectionery,
   a conveyor for moving the frozen confectionery past the coating station and the particle dispensing station, the conveyor comprising a gripper arranged on the conveyor and having a product attached position and an opened position for gripping and releasing the stick of the frozen confectionery, and
   the conveyor comprising guides for moving the gripper with the frozen confectionery between a vertical position and a horizontal position, and wherein the apparatus further comprises
   a heating station installed at a position between the coating station and the particle dispensing station, and wherein the gripper is arranged to hold the frozen confectionery in the horizontal position when passing the heating station and the; particle dispensing station and
   a coating removal means for removing coating material on one side of the frozen confectionery, which coating removal means are at a position after the coating station in the direction of the movement of the conveyor and before the particle dispensing station wherein the coating removal means comprises airflow means adapted to partially remove coating material from one side of the frozen confectionery.

2. Apparatus according to claim 1, wherein the heating station comprises a heater being either a radiation heater or an air heater positioned at a distance of 2 to 40 cm, above the gripper with the frozen confection in a horizontal position.

3. Apparatus according to claim 1, comprising a coating removal member that comprises an airflow member adapted to partially remove coating material from one side of the frozen confectionery.

4. Apparatus according to claim 3, wherein the airflow member is in the form of air knife, knives and/or curtain.

5. Apparatus according to claim 3, wherein the airflow member is positioned so that the direction of the flow of air of the airflow member, based upon a top down view onto the bar, is perpendicular to the direction of the movement of the products or with an angle of up to 60 degrees to either side of the conveyor movement as measured from the position perpendicular to the direction of the line movement of the product.

6. Apparatus according to claim 3, wherein apparatus comprises a heating device for heating the airflow to the coating removal member.

7. Apparatus according to claim 3, wherein the conveyor comprising a gripper arranged perpendicular to the direction of the movement of the conveyor.

8. Apparatus according to claim 3, wherein the coating removal member positioned after the coating station is at a position beside or beneath the conveyor.

9. Apparatus according to claim 1, wherein the coating removal member comprises a mechanical scraper.

10. Apparatus according to claim 1, wherein the particle dispensing station comprises a particulate dispensing hopper.

11. Apparatus according to claim 1, wherein the apparatus further comprises a particle supply system for collecting particles not attached to the frozen confectionery coating and conveying member to return collected particles back to the dispensing station.

12. Apparatus according to claim 1, wherein the apparatus further comprises a coating line applicator.

* * * * *